United States Patent
Lee

(10) Patent No.: US 9,279,317 B2
(45) Date of Patent: Mar. 8, 2016

(54) PASSIVE ACOUSTIC RESONATOR FOR FIBER OPTIC CABLE TUBING

(71) Applicant: Erik N. Lee, Houston, TX (US)

(72) Inventor: Erik N. Lee, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 377 days.

(21) Appl. No.: 13/803,049

(22) Filed: Mar. 14, 2013

(65) Prior Publication Data
US 2014/0262594 A1    Sep. 18, 2014

(51) Int. Cl.
*E21B 47/00*    (2012.01)
*G01H 13/00*    (2006.01)
*E21B 47/10*    (2012.01)

(52) U.S. Cl.
CPC .............. *E21B 47/00* (2013.01); *E21B 47/10* (2013.01); *G01H 13/00* (2013.01); *G01V 2210/1429* (2013.01)

(58) Field of Classification Search
CPC ..................................................... E21B 47/00
See application file for complete search history.

(56) References Cited

U.S. PATENT DOCUMENTS

| | | |
|---|---|---|
| 7,162,918 B2 | 1/2007 | DiFoggio et al. |
| 7,506,688 B2 | 3/2009 | Davila |
| 7,921,691 B2 | 4/2011 | DiFoggio et al. |
| 2005/0223808 A1 | 10/2005 | Myers et al. |
| 2010/0107754 A1 | 5/2010 | Hartog et al. |
| 2011/0088462 A1 | 4/2011 | Samson et al. |
| 2012/0111104 A1* | 5/2012 | Taverner et al. ........... 73/152.16 |
| 2014/0116138 A1 | 5/2014 | Sheverev et al. |

OTHER PUBLICATIONS

Donlagic, Denis, "An electrically passive acoustic resonance level gauge", Part of the SPIE Conference on Sensory Phenomena and Measurement Instrumentation for Smart Structures and Materials, Mar. 1999, pp. 154-162.
International Search Report and Written Opinion for PCT Application No. PCT/US2014/013568, dated Apr. 30, 2014, pp. 1-12.

* cited by examiner

*Primary Examiner* — Brad Harcourt
(74) *Attorney, Agent, or Firm* — Cantor Colburn LLP

(57) ABSTRACT

A passive acoustic system and a method of utilizing the passive acoustic system in a subsurface borehole are discussed. The method includes disposing the passive acoustic system in the borehole, the passive acoustic system including at least one passive acoustic resonator, and monitoring a frequency of an acoustic signal at the at least one passive acoustic resonator. The passive acoustic system includes a protective tubing, a fiber optic cable disposed within the protective tubing, a fluid layer between the fiber optic cable and the protective tubing, and at least one passive acoustic resonator, the at least one passive acoustic resonator representing an area within the protective tubing having a known geometry, wherein the fluid layer affects a frequency of an acoustic signal obtained from the at least one passive acoustic resonator.

15 Claims, 5 Drawing Sheets

PASSIVE ACOUSTIC RESONATOR FOR FIBER OPTIC CABLE TUBING

BACKGROUND

In downhole exploration and production, a variety of sensors and measurement devices may be deployed in various wells to characterize aspects of the environment. Exemplary sensors determine temperature, pressure, and density values. Some sensors can help to identify and characterize formations. Among the types of sensors are acoustic sensors. Typically, an acoustic signal is emitted downhole, and the received reflected signal is processed to obtain information.

SUMMARY

According to one aspect of the invention, a method of utilizing a passive acoustic system in a subsurface borehole includes disposing the passive acoustic system in the borehole, the passive acoustic system including at least one passive acoustic resonator; and monitoring a frequency of an acoustic signal at the at least one passive acoustic resonator.

According to another aspect of the invention, a passive acoustic system disposed in a downhole environment includes a protective tubing; a fiber optic cable disposed within the protective tubing; a fluid layer between the fiber optic cable and the protective tubing; and at least one passive acoustic resonator, the at least one passive acoustic resonator representing an area within the protective tubing having a known geometry, wherein the fluid layer affects a frequency of an acoustic signal obtained from the at least one passive acoustic resonator.

BRIEF DESCRIPTION OF THE DRAWINGS

Referring now to the drawings wherein like elements are numbered alike in the several Figures.

DETAILED DESCRIPTION

As noted above, the processing of a reflected acoustic signal is one of the many methods by which information about the downhole environment may be obtained. Embodiments of the invention described herein relate to a passive acoustic resonator.

Figure 1:
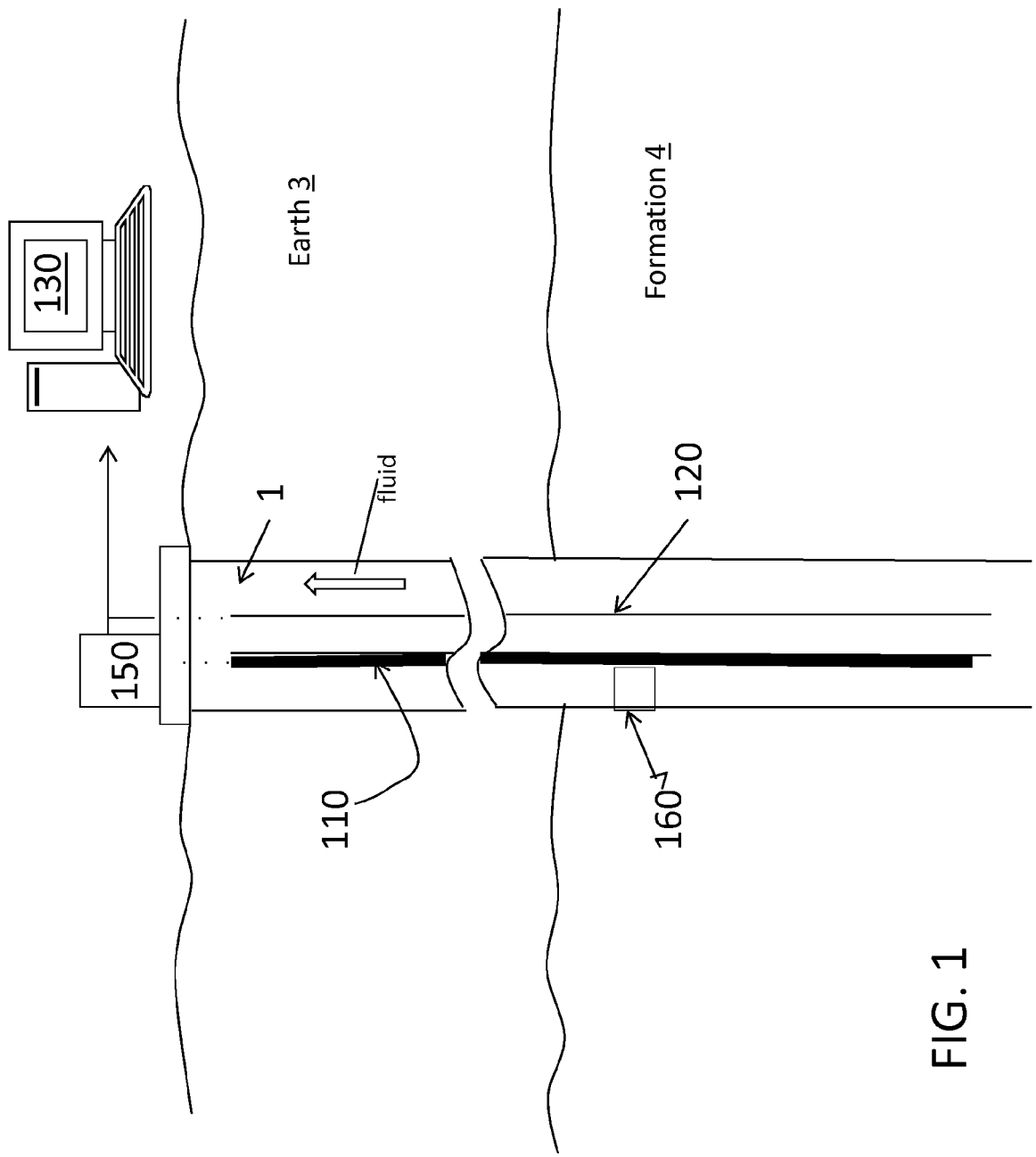
FIG. 1 is a cross-sectional illustration of a borehole 1 and a passive acoustic resonator 110 according to an embodiment of the invention.

FIG. 1 is a cross-sectional illustration of a borehole 1 and a passive acoustic system 110 according to an embodiment of the invention. The passive acoustic system 110 may be employed in any subsurface environment. In the embodiment shown in FIG. 1, a borehole 1 penetrates the earth 3 including a formation 4. In the embodiment shown in FIG. 1, a production fluid tube 120 is in the borehole 1 with the passive acoustic system 110 strapped to its outer surface. Other sensors and measurement devices 160 may be lowered by a string. The string may be a casing string, production string, an armored wireline, a slickline, coiled tubing, or a work string. In measure-while-drilling (MWD) embodiments, the string may be a drill string. In addition, information from the sensors and measurement devices 160 may be sent to the surface for processing by the surface processing system 130 via a fiber link or telemetry. The surface processing system 130 (e.g., computing device) includes one or more processors and one or more memory devices in addition to an input interface and an output device such as, for example, a display. A distributed acoustic sensing system 150 receives, and may process, the acoustic signal from the passive acoustic resonator 111 (via the fiber optic cable 117 contained within the control line 112). The processing of the acoustic signal may be in conjunction with the surface processing system 130. The passive acoustic sensor 110 is further detailed with reference to FIG. 2 below.

Figure 2:
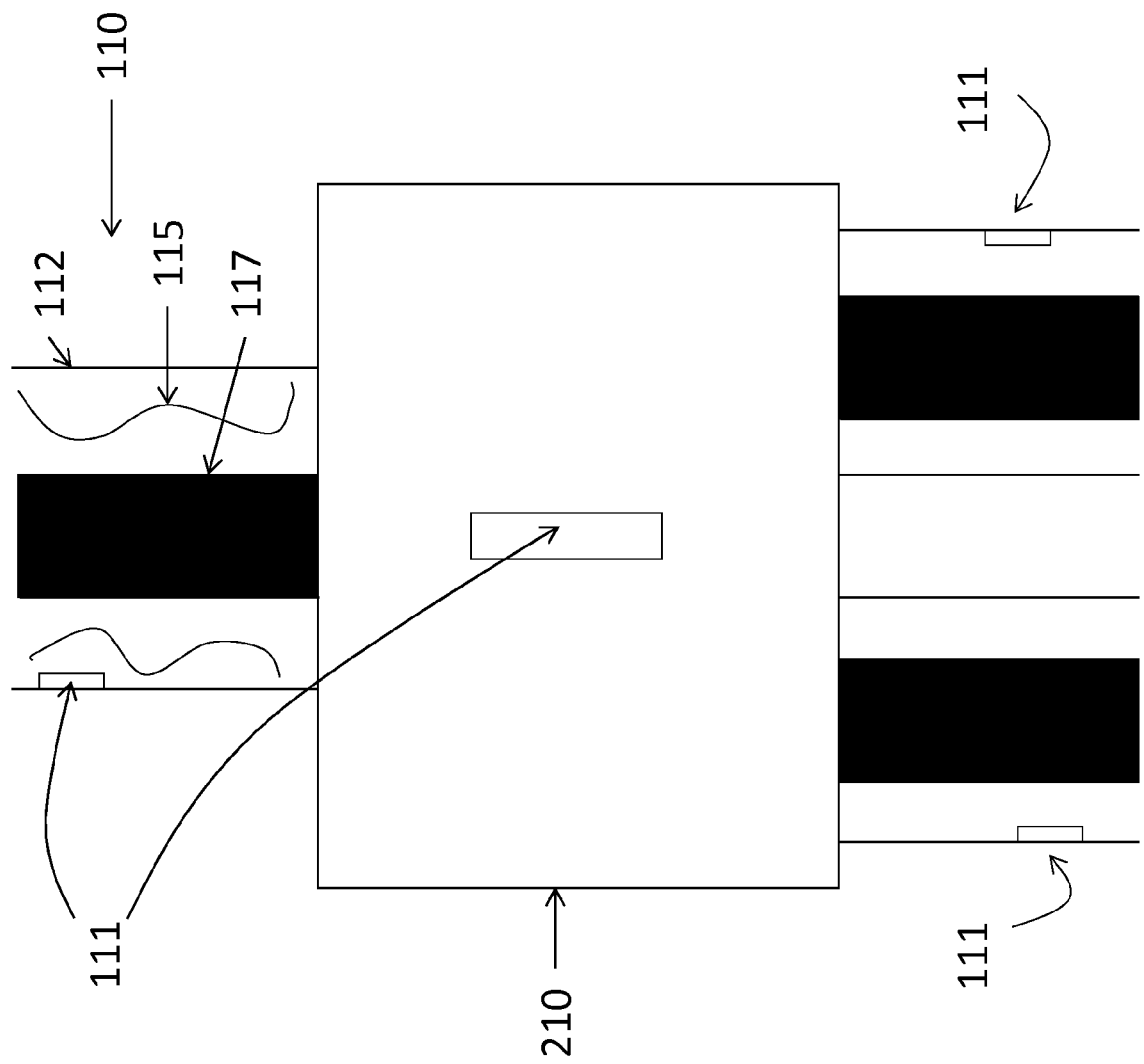
FIG. 2 is a cross-sectional view of a passive acoustic system according to an embodiment of the invention.

FIG. 2 is a cross-sectional view of a passive acoustic system 110 according to an embodiment of the invention. The passive acoustic system 110 includes a control line 112 surrounding at least one fiber optic cable 117, with a deployment fluid 115 therebetween. One or more passive acoustic resonators 111 (areas of known geometry) are disposed in the control line 112. In the embodiment shown in FIG. 2, the splice enclosure 210, in which the control lines 112 are joined, is a metal box with a known internal geometry such that the geometry of the passive acoustic resonator 111 within the splice enclosure 210 is defined. One or more such splice enclosures 210 with different but known internal geometries may be present in the borehole 1 (FIG. 1). In alternate embodiments, the internal geometry of the control line 112 itself may be specified rather than shaping the passive acoustic resonator 111 into a known geometry within the splice enclosure 210. The deployment fluid 115 may be air, for example, but may be any fluid that does not chemically react with the fiber optic cable 117. There is a 26% difference in the sound speed for air at 70 degrees Fahrenheit versus air at 390 degrees Fahrenheit. As an example, for a longitudinal standing acoustic wave, the natural frequency is defined as:

$$F = C/(4*L) \qquad [EQ. 1]$$

where F is the natural frequency in Hertz, C is the sound speed of the air, and L is the longitudinal length of the tube. When the passive acoustic resonator 111 is tested uphole, where the temperature is, for example, 70 degrees Fahrenheit, the natural frequency (F) differs by 26% from the natural frequency downhole, where the temperature may be, for example, 390 degrees Fahrenheit. This difference in natural frequency is attributable to the change in sound speed of air between the two temperatures.

Thus, when the deployment fluid 115 is air, there is a slight shift in the natural resonant frequency once the installation (the passive acoustic resonator 111) thermally equalizes with the downhole conditions. In fact, by calibrating the air sound speed (which is a function of temperature) to a natural resonant frequency using a known temperature source, the passive acoustic resonator 111 with air as the deployment fluid 115 may be used to determine air temperature downhole according to some embodiments. This may serve as a calibration or independent verification for other temperature sensors (e.g., among sensors 160) operating within the borehole 1 that are employing different physics to quantify the temperature. In alternate embodiments, the passive acoustic system 110 may serve as a standalone temperature sensor notwithstanding calibration of another temperature sensor. When the deployment fluid 115 (e.g., air) is different than wellbore fluids encountered downhole (e.g., formation fluids), the passive acoustic resonator 111 natural frequency is distinct from a frequency obtained from the passive acoustic resonator 111 following a breach of the borehole 1 by wellbore fluids. This difference facilitates breach detection using the passive acoustic resonator 111 as discussed below. However, as noted above, the natural resonant frequency of the passive acoustic resonator 111 may also change if the temperature of the deployment fluid 115 (e.g., air) changes. Thus, to distinguish a change in frequency of the passive acoustic resonator 111 due to an ingress of wellbore fluid from a change in frequency due to a temperature change leading to a change in density of the deployment fluid 115, a temperature sensor (e.g., another optical fiber within the same protective tubing 112 (control line)) may monitor the temperature of the deployment fluid 115 in some embodiments. When compressible deployment fluids 115 (e.g. air) are employed, supplemental thermal measurements are not required. This is because the passive acoustic resonator natural frequency shift for a compressible fluid, such as air, due to a thermal change is much less than the natural frequency shift for an incompressible fluid, such as wellbore fluids. Accordingly, an amount of the natural frequency shift indicates the ingress of wellbore fluids.

The passive acoustic resonator 111 is a static, passive system. That is, the passive acoustic resonator 111 will not resonate without some form of excitation (e.g., vibration, acoustic). The flow of a fluid through the production tube 120 produces a broadband vibration signal that serves as a forcing function to the passive acoustic resonator 111 and thereby produces acoustic energy at the natural frequency of the passive acoustic resonator 111. In order for the passive acoustic resonator 111 to produce acoustic energy from vibration, the acoustic mode must be lightly damped and the object containing the passive acoustic resonator 111 (e.g., control line 112 of the passive acoustic system 110 in FIG. 1) must be well coupled to the production tubing 120. That is, the design of the passive acoustic resonator 111 may be such that damping of the acoustic mode is minimized. For example, if a passive acoustic resonator 111 were shaped such that a longitudinal mode setup, a radius may be introduced at the end of a passive acoustic resonator 111 to decrease the damping of the acoustic mode. The natural resonant frequency of the passive acoustic resonator 111 is defined by the (known) resonator geometry and the fluid properties. When the fluid is the deployment fluid 115, whose physical properties are known, an initial or default resonance frequency is established. When this frequency changes (there is a shift in the natural frequency of the passive acoustic resonator 111), as indicated by the received acoustic signal at the area of known geometry, the frequency change may indicate a change in the fluid properties (because the geometry does not change). That is, barring a corresponding change in the temperature of the deployment fluid 115 as discussed above, the change in frequency obtained from the passive acoustic resonator 110 indicates a breach in the borehole 1 and the ingress of wellbore fluids (e.g., formation fluid). As noted above, the magnitude of the change in the passive acoustic resonator frequency will indicate whether the frequency shift was caused by a thermal change in the deployment fluid 115 or whether wellbore fluid has entered the control line 112. When a breach occurs, wellbore fluid begins to fill the system, and compresses the deployment fluid 115 (e.g., air) and drives it away from the breach location. In locations in which the deployment fluid 115 is compressed, the elevated pressure causes an increase in the fluid sound speed. When the deployment fluid 115 is air at 300 degrees Fahrenheit, for example, the sound speed difference is 4% when the pressure increases from 14 pounds per square inch absolute (psia) to 1000 psia. Hence it is possible to detect changes in pressure when the passive acoustic system 110 is thermally stable. In locations in which wellbore fluid is contained, the acoustic resonant frequency is distinctly different because the sound speed difference between the deployment fluid 115 and the dense wellbore fluids is significant. The use of the passive acoustic resonator 111 in identifying the breaching fluid is detailed below.

Generally, the passive acoustic resonator 111 may be any device with an acoustic mode that is defined by the device geometry and fluid properties. The material used to create the resonator may generally be hard and non-porous, because porous materials generally act as acoustic absorbers. In addition, the portion of the passive acoustic resonator 111 that is in contact with the fluid (e.g., deployment fluid 115) may be smooth when laminar and sub-turbulent flow is expected, while the portion may be rough for turbulent flow conditions to reduce damping by tripping the flow with the rough surface. Thus, the final design of the passive acoustic resonator 111 may take into consideration the expected flow conditions. As stated above, the passive acoustic resonator 111 may be any device for which the acoustic mode natural frequency is governed by geometry and fluid properties. Because the geometry is predefined or known, once the frequency is measured, the fluid properties may then be determined. The fluid properties may then be used to estimate the type of fluid as well as other physical conditions. The estimate requires other information such as temperature and pressure, which is generally available from the other sensors and measurement devices 160 (FIG. 1) deployed downhole.

In addition to indicating a breach and facilitating the identification of the breaching fluid, monitoring the frequency from the passive acoustic resonator 111 may also provide estimates of the downhole vibration environment. The passive acoustic resonator 111 may be calibrated using an electrodynamic shaker prior to deployment downhole, for example. Through the calibration process, acoustic energy may be correlated with vibration energy such that received acoustic signals from the passive acoustic resonator 111 may used to estimate the corresponding downhole vibration. Improved spatial resolution may be provided by deploying multiple passive acoustic resonators 111 tuned to different frequencies. This would provide better coverage of the frequency bandwidths of interest. Monitoring the vibration environment downhole may be helpful in tool maintenance and design, for example. That is, knowing the downhole vibration environment may help in designing tools that can withstand that environment for long periods of time (e.g., 10 years). In addition, a sudden and/or relatively large change in the vibrational energy estimate may be used to indicate a tool failure or change in the well.

Figure 3:
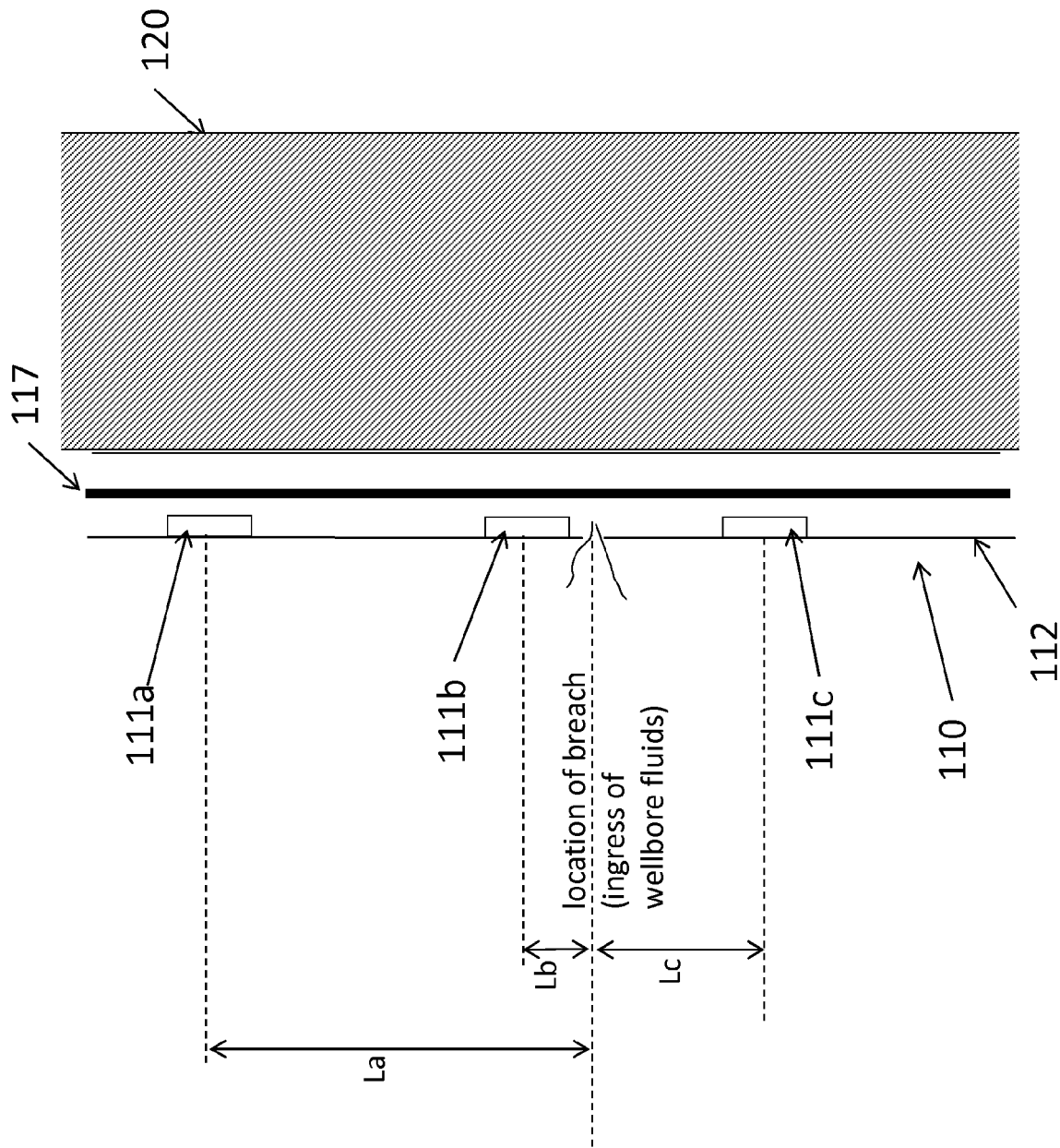
FIG. 3 illustrates a passive acoustic system including three passive acoustic resonators according to embodiments of the invention.

FIG. 3 illustrates a passive acoustic system 110 including three passive acoustic resonators 111 according to embodiments of the invention. The passive acoustic resonators 111 are within a passive acoustic system 110 that is strapped to a production fluid tube 120 as in FIG. 1. When more than one passive acoustic resonator 111 is used downhole, and the known geometry (the area of the passive acoustic resonator 111 at which the frequency is monitored) of each passive acoustic resonator 111 is at a different depth, then the location (depth) of the breach may be estimated, as well. For example, FIG. 3 illustrates a breach in the control line 112 between two passive acoustic resonators 111b and 111c. In this exemplary case, the second passive acoustic resonator 111b would detect the breach first (identified by a frequency shift) since it is the closest to the breach. After some time, proportional to Lc/Lb, the third passive acoustic resonator 111c would display a change in frequency indicating that the wellbore fluid had ingressed to that position. Lastly, the top-most passive acoustic resonator 111a according to the exemplary embodiment of FIG. 3 would display a frequency shift indicating a change in the fluid within that region of the fiber optic control line 112. Based on the timing of these detected events, the breach may be estimated to be located between passive acoustic resonators 111b and 111c. In addition, the most probable location may be estimated to be closer to passive acoustic resonator 111b than to passive acoustic resonator 111c.

Figure 4:
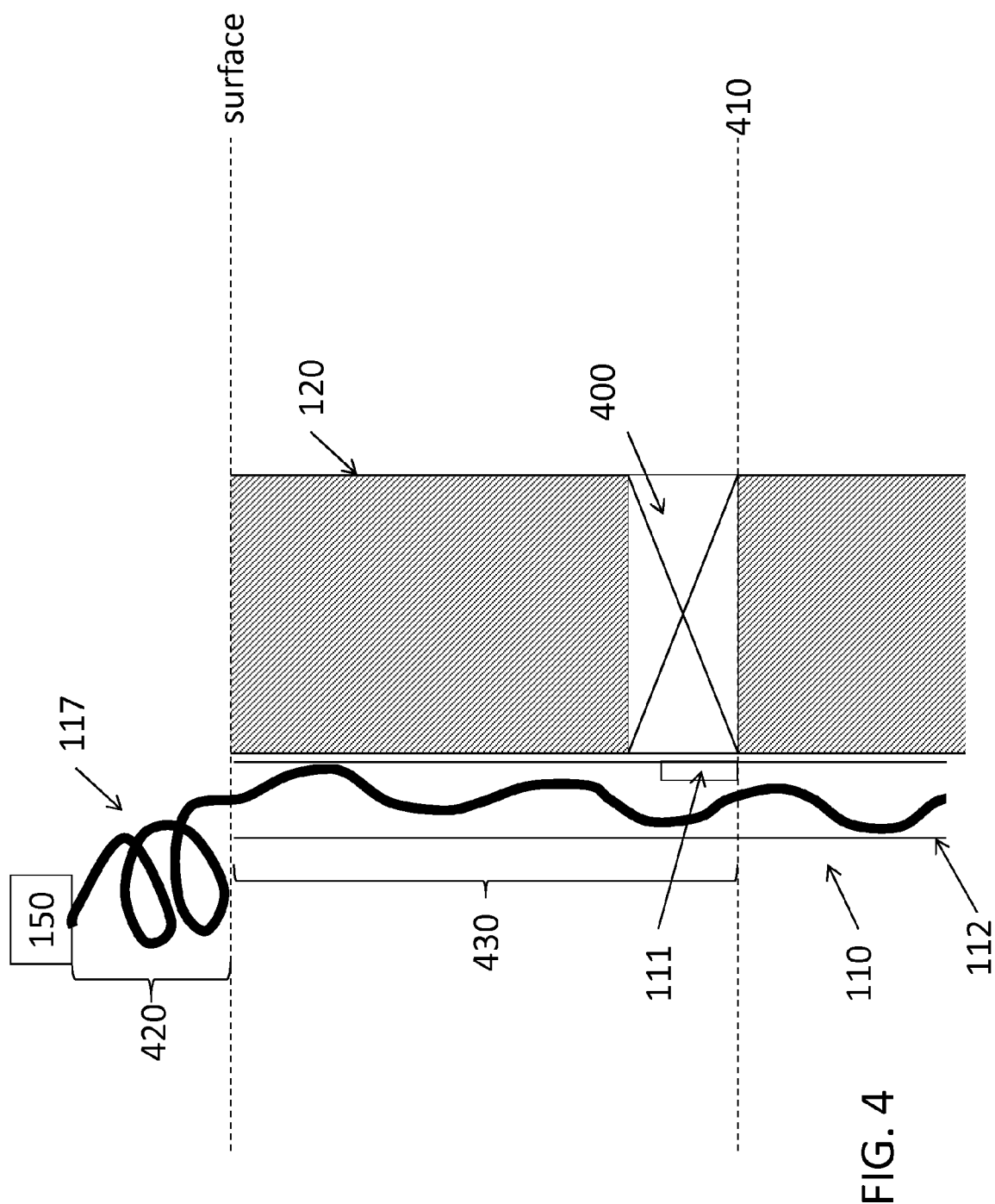
FIG. 4 illustrates a passive acoustic system with one passive acoustic resonator according to embodiments of the invention.

FIG. 4 illustrates a passive acoustic system 110 with one passive acoustic resonator 111 according to embodiments of the invention. One or more passive acoustic resonators 110 may be used to correlate the physical location of completion system hardware (e.g., valve, packer, other metal component) with the length of fiber optic cable 117 required to reach that physical depth. That is, when a passive acoustic resonator 111 is installed in a fiber optic control line 112 and the passive acoustic resonator 111 is co-located with a physical completion component (e.g., valve 400 as in FIG. 4), the total length of fiber optic cable 117 used to reach the depth of the valve 400 may be determined. FIG. 4 shows a valve 400 at a given physical valve depth 410 in the borehole 1 with a control line 112 encapsulating fiber optic cable 117 attached to the production fluid tube 120. FIG. 4 illustrates the fiber optic cable 420 required to reach from the surface of the well to the distributed acoustic sensing system 150 and the extra fiber length 430 that is contained within the control line 112 (due to the fiber optic cable 117 not being taut within the control line 112). For example, with an exemplary physical valve depth 410 of 100 meters, the fiber length 430 over 100 meters of control line 112 including the extra fiber length may be 112 meters and the surface fiber optic cable 420 may be 200 meters. Thus, under these exemplary conditions, the passive acoustic resonator 111 at a physical depth of 100 meters would be at a distance of 312 meters (112+200) away from the distributed acoustic sensing system 150. Hence, this relationship would serve as a calibration of the fiber optic cable 117 length to well depth and is made possible because the passive acoustic resonator 111 may be detected along the fiber optic cable 117 at 312 meters.

Figure 5:
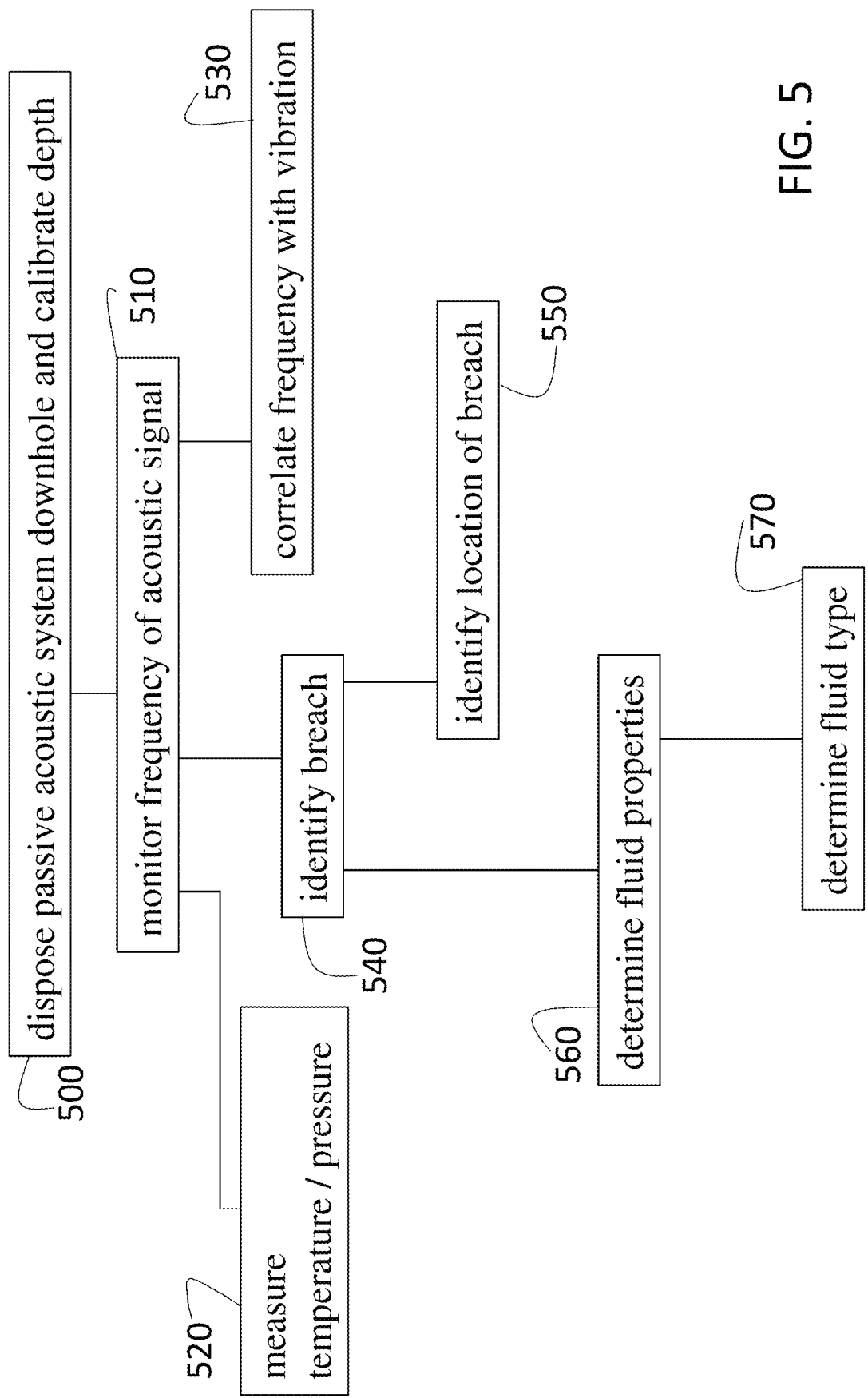
FIG. 5 is a process flow of a method of using a passive acoustic system downhole according to embodiments of the invention.

FIG. 5 is a process flow of a method of using a passive acoustic system 110 downhole according to embodiments of the invention. At block 500, the method includes disposing the passive acoustic system 110, including one or more passive acoustic resonators 111 downhole and calibrating the physical depth of the passive acoustic resonators 111 as discussed above. The passive acoustic system 110 may be strapped to the surface of a production fluid tube 120 (FIG. 1), for example. By co-locating a passive acoustic resonator 111 with a physical completion component at a known physical depth, the fiber optic cable 117/140 length between the distributed acoustic sensing system 150 and the passive acoustic resonator 111 may be determined. At block 510, monitoring the frequency of an acoustic signal, received from a passive acoustic resonator 111, may be done, for example, by using a fiber optic distributed acoustic sensing system (117/150, FIG. 1). Block 520 includes measuring temperature or pressure. As discussed above, by monitoring frequency of the passive acoustic resonator 111, temperature may be measured. Further, in a stable thermal environment, pressure may be measured. This is because both temperature and pressure changes affect sound speed which, in turn, affects frequency. At block 530, correlating the frequency with vibration in the downhole environment includes calibrating the passive acoustic resonator 111 prior to deployment downhole to determine the vibration level corresponding with frequency. The calibration may be done using an electrodynamic shaker, for example. At block 540, identifying a breach indicating ingress of wellbore fluid into the control line 112 includes identifying a change in the frequency of the acoustic signal received from the passive acoustic resonator 111. As discussed above, identifying a breach may also include monitoring the temperature of the deployment fluid 115 to ensure that temperature change resulting in density change and a resultant change in sound speed, rather than a breach, is not responsible for the frequency change. Based on the deployment fluid 115 being compressible (e.g., deployment fluid 115 is air), the frequency shift due to an ingress of wellbore fluid would be sufficiently larger than any shift attributable to temperature change such that the temperature monitoring may not be needed to identify a breach. When more than one passive acoustic resonator 111 is deployed, identifying a location of the breach (block 550) is based on the timing at which each of the passive acoustic resonators 111 experiences a change in the natural resonant frequency, as discussed above. When a breach has been identified, determining fluid properties (block 560) of the ingress fluid includes using the relationship between monitored frequency, geometry (known), and fluid properties as discussed above. At block 570, determining the fluid type of the ingress fluid is based on the fluid properties and may also require knowledge of temperature and pressure, as discussed above.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of utilizing a passive acoustic system in a subsurface borehole, the method comprising:
   disposing the passive acoustic system in the borehole, the passive acoustic system including at least one passive acoustic resonator;
   monitoring a frequency of an acoustic signal at the at least one passive acoustic resonator and
   determining properties of wellbore fluid, the determining including identifying an ingress of the wellbore fluid into the passive acoustic system, based on the frequency of the acoustic signal and a known geometry of the at least one passive acoustic resonator.

2. The method according to claim 1, wherein the monitoring the frequency is based on a fiber optic distributed acoustic sensing system.

3. The method according to claim 1, further comprising measuring temperature based on the frequency.

4. The method according to claim 1, further comprising measuring pressure based on the frequency.

5. The method according to claim 1, further comprising calibrating a depth of the at least one passive acoustic resonator based on a completion system component disposed at a known depth in the borehole.

6. The method according to claim 1, further comprising correlating the frequency of the acoustic signal with a vibration level.

7. The method according to claim 6, wherein the correlating includes calibrating the passive acoustic resonator to determine a set of vibration levels corresponding with a set of frequencies prior to disposing the passive acoustic resonator in the borehole.

8. The method according to claim 1, further comprising disposing another passive acoustic resonator and monitoring another frequency of another acoustic signal at the another passive acoustic resonator, wherein the at least one passive acoustic resonator is at a first depth and the another passive acoustic resonator is at a second depth.

9. The method according to claim 8, further comprising estimating a depth of a breach causing the ingress based on the monitoring the frequency at the first depth and the another frequency at the second depth.

10. The method according to claim 1, further comprising determining a type of the wellbore fluid based on the properties and on temperature and pressure in the borehole determined by one or more sensors.

11. The method according to claim 1, wherein the disposing the passive acoustic system includes disposing a protective tubing surrounding a fiber optic cable with a deployment fluid therebetween, the at least one passive acoustic resonator representing an area within the protective tubing having a known geometry.

12. The method according to claim 11, further comprising monitoring a temperature of the deployment fluid based on the frequency of the acoustic signal.

13. A passive acoustic system disposed in a downhole environment, the passive acoustic system comprising:
 a protective tubing;
 a fiber optic cable disposed within the protective tubing;
 a fluid layer between the fiber optic cable and the protective tubing; and
 at least one passive acoustic resonator, the at least one passive acoustic resonator representing an area within the protective tubing having a known geometry, wherein the fluid layer affects a frequency of an acoustic signal obtained from the at least one passive acoustic resonator and at least one of the at least one passive acoustic resonator is separated from the fiber optic cable by the fluid layer.

14. The system according to claim 13, wherein the passive acoustic resonator is within a splice enclosure.

15. The system according to claim 13, wherein the geometry is shaped within the protective tubing.

\* \* \* \* \*